US010355264B2

(12) United States Patent
Ross et al.

(10) Patent No.: US 10,355,264 B2
(45) Date of Patent: Jul. 16, 2019

(54) SECONDARY BATTERY

(75) Inventors: William J. Ross, Mukwonago, WI (US); David Mendoza, Glendale, WI (US); Brian DeGuzman, Milwaukee, WI (US)

(73) Assignee: CPS Technology Holdings LLC, New York, NY (US)

( * ) Notice: Subject to any disclaimer, the term of this patent is extended or adjusted under 35 U.S.C. 154(b) by 1041 days.

(21) Appl. No.: 13/395,273

(22) PCT Filed: Sep. 10, 2010

(86) PCT No.: PCT/US2010/048421
§ 371 (c)(1),
(2), (4) Date: May 16, 2012

(87) PCT Pub. No.: WO2011/031963
PCT Pub. Date: Mar. 17, 2011

(65) Prior Publication Data
US 2012/0219850 A1 Aug. 30, 2012

Related U.S. Application Data

(60) Provisional application No. 61/241,226, filed on Sep. 10, 2009.

(51) Int. Cl.
H01M 2/30 (2006.01)
H01M 10/06 (2006.01)

(52) U.S. Cl.
CPC ........... *H01M 2/307* (2013.01); *H01M 10/06* (2013.01); *Y02T 10/7016* (2013.01); *Y10T 29/49174* (2015.01)

(58) Field of Classification Search
None
See application file for complete search history.

(56) References Cited

U.S. PATENT DOCUMENTS

| | | | |
|---|---|---|---|
| 1,175,651 A | 3/1916 | Marko | |
| 1,687,262 A | 10/1928 | Vaughn | |
| 1,789,951 A | 1/1931 | Terrell et al. | |
| 2,067,195 A | 1/1937 | Knapp et al. | |
| 3,152,854 A | 10/1964 | Osborn | |
| 3,568,139 A | 3/1971 | Delzer | |
| 3,605,065 A | 9/1971 | Shannon | |
| 3,821,694 A | 6/1974 | Gottlieb et al. | |
| 4,030,796 A | 6/1977 | Patzer | |
| 4,064,328 A | 12/1977 | Allen | |
| 4,082,401 A | 4/1978 | Kruszecki | |
| 4,560,229 A | 12/1985 | Benton | |
| 4,636,025 A | 1/1987 | Norris | |
| 4,645,725 A | 2/1987 | Kump et al. | |
| 4,701,386 A | 10/1987 | Kump et al. | |
| 4,945,749 A | 8/1990 | Walker et al. | |
| 5,283,137 A | 2/1994 | Ching | |
| 5,302,143 A | 4/1994 | Inoue et al. | |
| 5,424,148 A | 6/1995 | Mrotek et al. | |
| D371,539 S | 7/1996 | O'Glee | |
| 5,733,152 A | 3/1998 | Freitag | |
| 5,879,202 A | 3/1999 | Zhao | |
| 5,918,661 A | 7/1999 | Del Mercado et al. | |
| 6,074,243 A | 6/2000 | Edwards | |
| 6,258,481 B1 | 7/2001 | Ross et al. | |
| D465,454 S | 11/2002 | Kim | |
| 6,517,390 B2 | 2/2003 | Kim | |
| 6,568,642 B1 | 5/2003 | Kirschner | |
| D488,129 S | 4/2004 | Kim | |
| 6,737,192 B2 | 5/2004 | Yabuki et al. | |
| 6,764,353 B2 | 7/2004 | Freitag | |
| 6,817,908 B2 | 11/2004 | Freitag | |
| 6,830,490 B2 | 12/2004 | Murakami et al. | |
| 6,921,611 B2 | 7/2005 | Schaeffer et al. | |
| 7,189,123 B2 | 3/2007 | Orange et al. | |
| 7,234,979 B2 | 6/2007 | Fujii | |
| 7,614,921 B2 | 11/2009 | Sikora | |
| D607,405 S | 1/2010 | Mack | |

(Continued)

FOREIGN PATENT DOCUMENTS

EP 601521 12/1993
EP 632530 5/1994
(Continued)

OTHER PUBLICATIONS

International Preliminary Report on Patentability in International Serial No. PCT/US2010/048421.

(Continued)

*Primary Examiner* — Ladan Mohaddes

(74) *Attorney, Agent, or Firm* — Boardman & Clark LLP

(57) ABSTRACT

A battery is provided with a battery cover having a first cover mold insert and a second cover mold insert which are interchangeable in the cover prior to molding depending at least in part on the battery's polarity configuration. The first cover mold insert has a bushing that is relatively different in dimension, size and/or shape than the bushing of the second cover mold insert, such that each bushing is adapted to receive a cast-on-strap post of a relatively different dimension, size and/or shape. The first cover mold insert may also have a terminal that is relatively different in dimension, size and/or shape than the terminal of the second cover mold insert, such that each terminal is adapted to engage a formation connector contact of a relatively different dimension, size and/or shape.

13 Claims, 3 Drawing Sheets

(56) References Cited

U.S. PATENT DOCUMENTS

| | | |
|---|---|---|
| D621,353 S | 8/2010 | Mack |
| 2001/0049053 A1 | 12/2001 | Hasegawa et al. |
| 2001/0053636 A1 | 12/2001 | Tamai et al. |
| 2002/0148634 A1 | 10/2002 | Braden |
| 2003/0039882 A1 | 2/2003 | Wruck et al. |
| 2003/0077483 A1 | 4/2003 | Streuer et al. |
| 2007/0264883 A1 | 11/2007 | Freitag |
| 2008/0224021 A1 | 9/2008 | Gang |

FOREIGN PATENT DOCUMENTS

| | | |
|---|---|---|
| EP | 2093336 | 8/2009 |
| GB | 2428336 | 1/2007 |
| JP | 61-198552 | 9/1986 |
| JP | 04121957 * | 4/1992 |
| WO | WO 03/077349 A1 | 9/2003 |

OTHER PUBLICATIONS

Written Opinion of the International Searching Authority in International Serial No. PCT/US2010/048421.

* cited by examiner

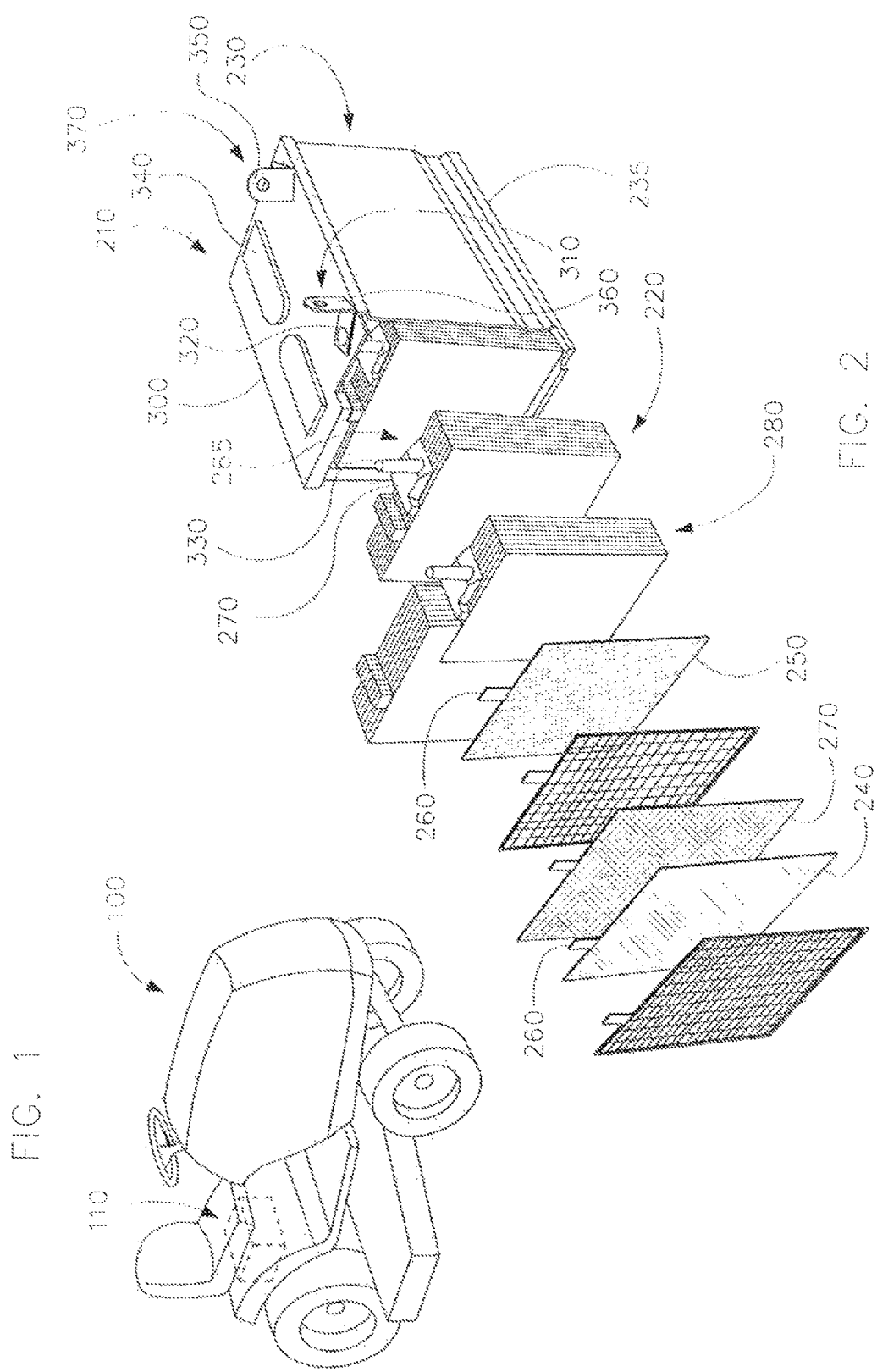

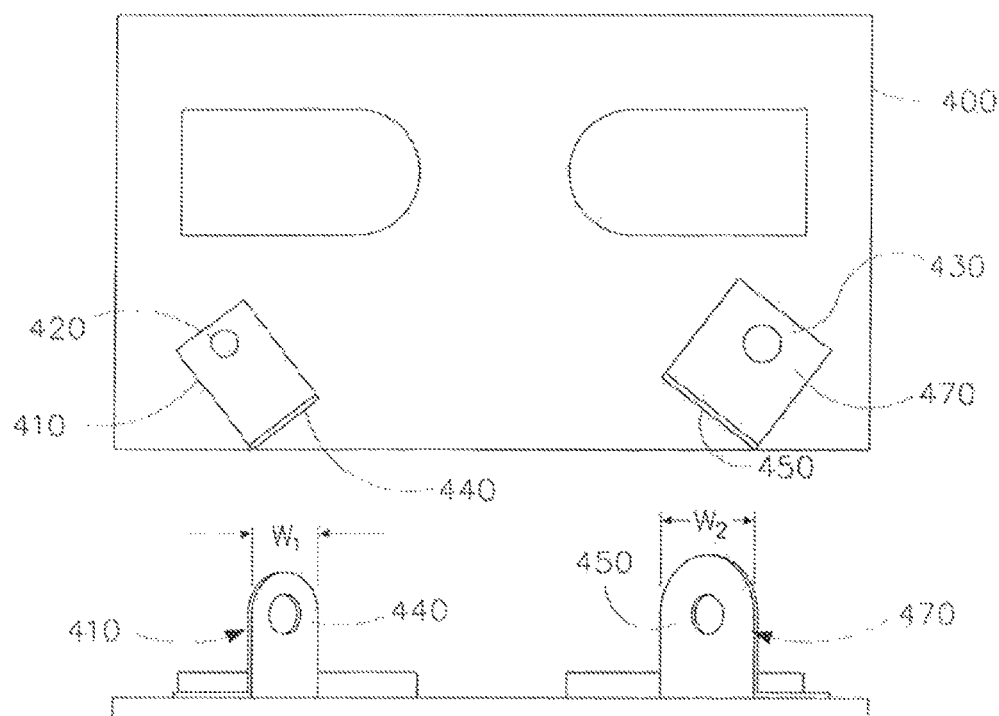
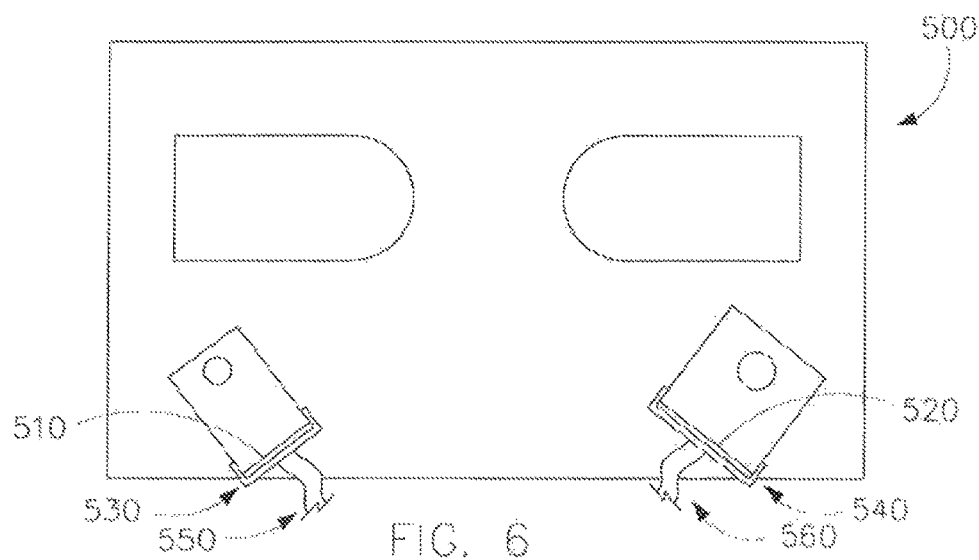

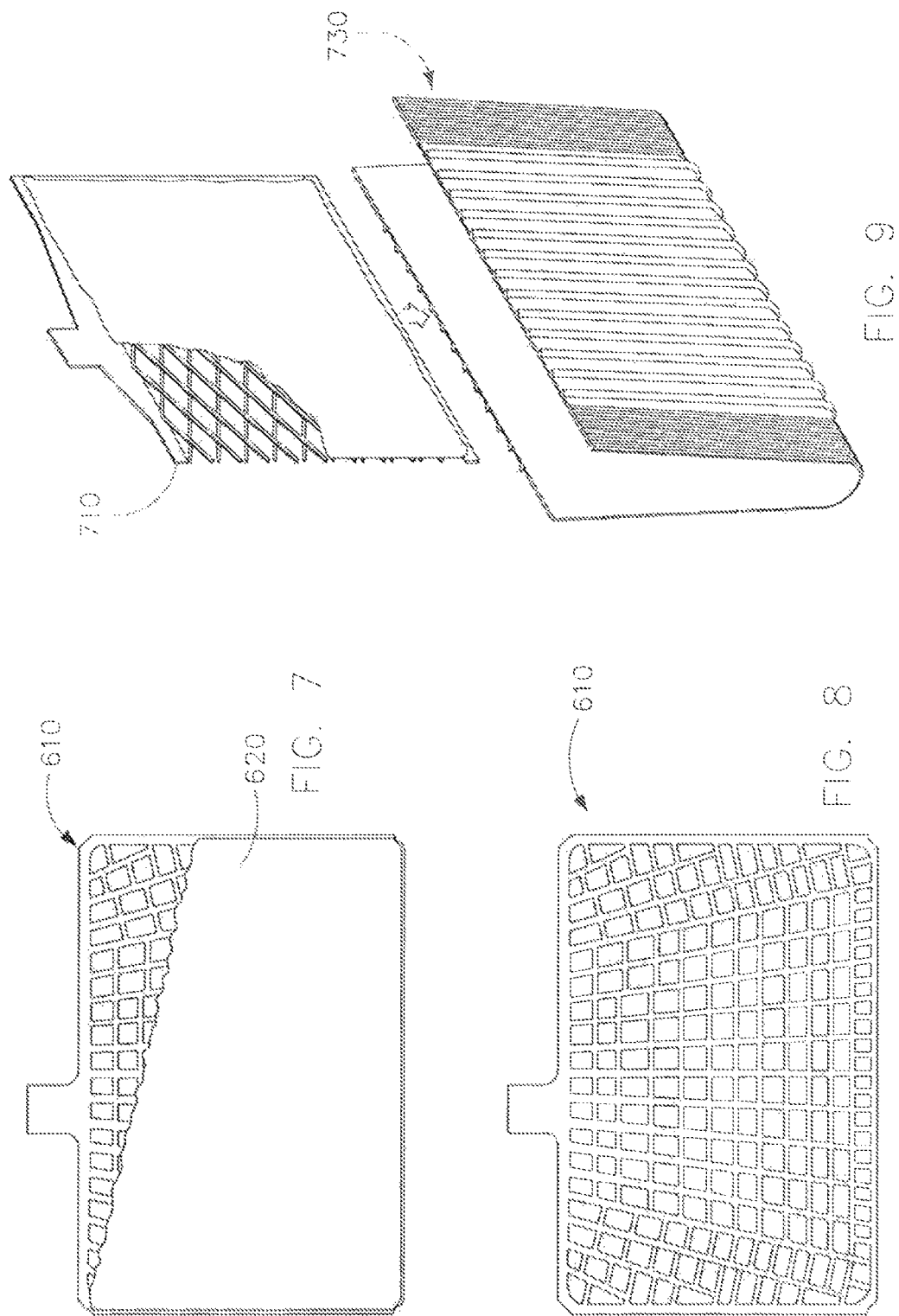

SECONDARY BATTERY

PRIORITY

This application claims priority to U.S. Provisional Patent Application Ser. No. 61/241,226 entitled "Secondary Battery" which was filed Sep. 10, 2009, and International Application PCT/US2010/048421 filed Sep. 10, 2010, which are incorporated herein by reference in their entirety.

FIELD

The present invention relates to the field of batteries (e.g., lead-acid batteries including lawn and garden batteries; batteries for vehicle starting, lighting and ignition applications; golf car batteries; marine batteries; commercial batteries; industrial batteries; batteries for use with hybrid-electric vehicles, microhybrid vehicles, etc.). The present invention more specifically relates to cast-on-straps, battery terminals and bushings.

BACKGROUND

It is known to provide for multiple terminals that may be used for providing an external electrical contact for a secondary battery (e.g., an electrical contact on the outside of a battery housing). In some configurations, one or more of the terminals are provided on, in, or through a cover of the battery housing (e.g., as cover mold inserts). It is also known to provide a bushing that may be used to electrically connect each terminal to an element or conductive (e.g., cast-on strap) post. Such terminals, bushings, posts, and/or battery housings do not realize certain advantageous features (and/or combinations of features). For example, it is known to improperly assemble batteries and/or for batteries to be improperly formed.

SUMMARY

It would be desirable to provide a battery, battery terminal, bushing, post, battery housing or the like of a type disclosed in the present application that includes any one or more of the following or other advantageous features.

In one aspect of the present invention, a secondary battery includes a battery cover including at least one cover mold insert, battery terminal, and/or bushing that is configured such that the cover can only be placed or provided on the battery or container in one or more desired orientations.

In another aspect of the present invention, a secondary battery includes a cover mold insert, battery terminal, and/or bushing that is unique in size, shape or other feature relative to another cover mold insert, battery terminal, and/or bushing, but may be used interchangeably with the other cover mold insert, battery terminal, and/or bushing, in the cover mold, as desired (e.g., where polarity is desirably reversed such as in U1 and U1R configurations).

In another aspect of the present invention, a secondary battery allows, is configured or adapted, for unique coupling of a formation cable such that the formation cable can only be coupled in one or more desired orientations (e.g., each cover mold insert, bushing, and/or terminal is shaped and/or sized differently relative to another cover mold insert, bushing, and/or terminal to fit each or a particular formation cable connector).

In another aspect of the present invention, a secondary battery includes at least two battery terminals that include bushings of different relative dimensions or sizes.

In another aspect of the present invention, a secondary battery includes a positive cast-on-strap and a negative cast-on-strap, wherein a flag, tombstone, and/or internal diameter of the positive cast-on-strap (e.g., post) is different from a flag, tombstone, and/or diameter (e.g. internal diameter) of the negative cast-on-strap (e.g., post).

In another aspect of the present invention, a secondary battery includes interchangeable cover mold inserts (e.g., usable on a left-hand side and a right-hand side of the battery) such that a cover can be used for and/or adapted for use with either left-hand or right-hand polarity secondary batteries.

In another aspect of the present invention, a secondary battery includes a positive cast-on-strap (e.g., post) and a negative cast-on-strap (e.g., post), wherein only one of the positive cast-on-strap and the negative cast-on-strap can be inserted through a cover mold opening, cover mold insert, and/or bushing.

In another aspect of the present invention, a secondary battery includes a set of bushings and a set of corresponding cast-on-straps (e.g., posts), wherein at least one of the bushings in the set is shaped and/or sized such that one of the cast-on-straps (e.g., post, a non-corresponding cast-on-strap (e.g., post)) will not fit through or into, or otherwise properly fit, that bushing.

In another aspect of the present invention, a secondary battery includes a set of bushings and a set of corresponding cast-on-straps (e.g., posts), wherein at least one of the bushings in the set is shaped and/or sized and/or one of the cast-on-straps (e.g., posts) in the set is shaped and/or sized such that a cast-on-strap in the set fits a bushing in the set better than another bushing in the set of bushings.

In another aspect of the present invention, a secondary battery includes a set of cover mold inserts, bushings, and/or terminals wherein a cover mold insert, bushing and/or terminal has a different shape and/or size relative to another cover mold insert, bushing, and/or terminal such that a formation cable can only be properly coupled or connected to the set of bushings and/or terminals according to one or more desired orientations.

In another aspect of the present invention, a secondary battery includes a set of cover mold inserts, bushings, and/or terminals wherein a cover mold insert, bushing and/or terminal has a different shape and/or size relative to another cover mold insert, bushing, and/or terminal such that a formation cable connector fits a cover mold insert, bushing, and/or terminal better than another cover mold insert, bushing, and/or terminal.

In another aspect of the present invention, a formation cable includes a number of formation cable connectors, wherein a formation cable connector has a different shape and/or size relative to another formation cable connector such that a formation cable connector is more specially adapted to be coupled or connected to a cover mold insert, bushing, and/or terminal of a certain shape and/or size.

The present invention is directed to a battery cover comprising a first cover mold insert defining a bushing of a first cross-section; and a second cover mold insert defining a bushing of a second cross-section; wherein the first cross-section is different from the second cross-section.

The present invention is directed to a secondary battery comprising a battery cover comprising a first cover mold insert defining a bushing of a first lateral cross-section, and a second cover mold insert defining a bushing of a second lateral cross-section; wherein the first lateral cross-section is different from the second lateral cross-section.

The present invention is directed to a method of secondary battery formation comprising releasably coupling to a first terminal of a battery a first formation cable connector having a first connector lateral cross-section; and releasably coupling to a second terminal of a battery a second formation cable connector having a second connector lateral cross-section; wherein the first connector lateral cross-section and second connector are different when releasably coupled to the first and second terminals of the battery.

These and other aspects and objects and advantages will be apparent from the description which follows. While this invention will be disclosed and discussed primarily in terms of specific embodiments thereof, it is not intended to be limited thereto. Other modifications and embodiments will be apparent or will become apparent to those skilled in the art upon reading the following detailed description, and/or upon reference to the drawings.

BRIEF DESCRIPTION OF THE DRAWINGS

Various exemplary embodiments of the systems and methods according to the present disclosure will be described in detail, with reference to the following figures, wherein:

FIG. 1 is an isometric view of a vehicle including a battery according to an exemplary embodiment;

FIG. 2 is an isometric cut-away exploded view of a portion of a battery according to an exemplary embodiment;

FIG. 3 is a top view of a battery cover including two battery terminals according to an exemplary embodiment;

FIG. 4 is a plan view of the battery cover shown in FIG. 3;

FIG. 5A is an isometric view of a first battery terminal and first bushing according to an exemplary embodiment;

FIG. 5B is an isometric view of a second battery terminal and bushing according to an exemplary embodiment;

FIG. 6 is a schematic representation of the top of a battery with a portion of formation cables according to an exemplary embodiment;

FIG. 7 is a front plan cut-away view of a portion of a battery plate or electrode (e.g., positive battery plate) comprising a stamped grid and active material according to an exemplary embodiment;

FIG. 8 is a front plan view of a stamped grid (e.g., positive grid) according to an exemplary embodiment;

FIG. 9 is an isometric cut-away view of a battery plate or electrode (e.g., negative battery plate) and separator according to an exemplary embodiment.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAIL DESCRIPTION

Referring to FIG. 1, a vehicle 100 is shown that includes a battery 110 according to an exemplary embodiment. While vehicle 100 is shown as a lawn/garden tractor, according to various alternative embodiments, the vehicle may comprise any variety of types of vehicles including, among others, cars, motorcycles, buses, recreational vehicles, boats, and the like. According to an exemplary embodiment, vehicle 100 uses an internal combustion engine for locomotive purposes.

Battery 110 shown in FIG. 1 is configured to provide at least a portion of the power required to start or operate vehicle 100 and/or various vehicle systems (e.g., starting, lighting and ignition (SLI) systems). Further, it should be understood that battery 110 may be utilized in a variety of applications not involving a vehicle, and all such applications are intended to be within the scope of the present disclosure.

The battery may include any type of secondary battery (e.g., rechargeable battery). According to an exemplary embodiment, battery 110 includes a lead-acid storage battery. Various embodiments of lead-acid storage batteries may be either sealed (e.g., non-maintenance) or unsealed (e.g., wet). According to an exemplary embodiment, the lead-acid storage battery is an unsealed lead-acid battery and periodically requires the addition of electrolyte and/or water to maintain a desired volume and/or concentration of either or both. According to various exemplary embodiments, battery 110 is a lawn and garden battery or deep cycle battery.

A lead-acid storage battery 210 according to an exemplary embodiment is illustrated in FIG. 2. In various embodiments, lead-acid storage battery 210 includes several plate blocks or cell elements 220 which are provided in separate compartments of a container or housing 230 containing electrolyte. The illustrations provided herein relate to applications where groups of 12-16 plates are used in each of six stacks for producing a standard automotive 12-volt battery. It will be obvious to those skilled in the art after reading this specification that the size and number of the individual grids, the size, thickness, and number of plates in any particular stack, and the number of stacks used to construct the battery may vary widely depending upon the desired end use. For example, grids and/or plates may be relatively larger and/or thicker in a lawn and garden tractor battery than compared to those in a SLI battery.

In various embodiments, battery housing 230 includes a box-like base or container 235 and is made of a moldable resin. A plurality of plate blocks are connected in series according to the capacity of battery 210 and are accommodated in the battery container or housing 230 together with the electrolyte, which is most commonly aqueous sulfuric acid.

In various embodiments, battery 210 or battery housing 230 includes a compartment having a front wall, end walls, a rear wall and a bottom wall. In various embodiments, five cell partitions or dividers are provided between the end walls, resulting in the formation of six compartments, as typically would be present in a twelve volt battery. In various embodiments, a plate block or cell element is located in each compartment, each plate block or cell element including one or more positive plates 240 and negative plates 250, each having at least one lug 260, and separator material 270 placed or otherwise provided between each positive plate 240 and negative plate 250.

A cover 300 is provided for container 235, and in various embodiments, cover 300 includes cover mold inserts 310/370 having bushings 320 that receive or are adapted to receive a post 330 and/or a portion of a cast-on-strap passing into and/or through cover 300. In various embodiments, cover 300 may also include fill tubes to allow electrolyte to be added to the cells and to permit servicing. To prevent undesirable spillage of electrolyte from the fill tubes, and to permit exhausting of gases generated during the electrochemical reaction, battery 210 may also include one or more filler hole caps and/or vent cap assemblies 340.

At least one first terminal (e.g., positive terminal) 350 and second terminal (e.g., negative terminal) 360 may be found on or about the top or front of battery 210. Such terminals 350/360 typically include portions which may extend from or through the cover and/or the front of the battery housing, depending upon the battery design.

FIG. 2 also shows a conventional cast-on-strap 265 which includes a rectangular, elongated body portion 270 of a length sufficient to electrically couple each lug 260 in a plate set 280 and an upwardly extending member or post 330 having a rounded top. FIG. 2 also illustrates cast-on-strap 265 coupling lugs 260 to a the second terminal (e.g., negative terminal) 360. As shown in FIG. 2, according to various embodiments, cast-on-strap 265 includes body portion 270 coupling respective lugs 260 in the end compartments and post 330 formed therewith to protrude through cover 300. In various embodiments, posts 330 also extend through a terminal post seal assembly (not shown) and/or bushing 320 to help prevent leakage of acid. It will be recognized that a variety of terminal arrangements are possible, including top, side or corner configurations known in the art. It will also be recognized that various polarity configurations are also available.

In various exemplary embodiments, cast-on-strap post 330 coupled or adapted to be coupled to second terminal 360 is different (e.g., has a different size and/or shape) than the cast-on-strap post coupled or adapted to be coupled to first terminal 350. In various embodiments, each cover mold insert and/or terminal (e.g., positive cover mold insert 370 or terminal 350 and negative cover mold insert 310 or terminal 360) has a different size and/or shape relative to the other. Bushings 320 may be defined by cover mold inserts 310/370 otherwise provided that are coupled around or otherwise adapted to receive a portion of each cast-on-strap post. Each bushing 320 may be sized and/or shaped such that it cannot be easily or properly provided on or around a particular cast-on-strap post (e.g., the wrong cast-on-strap post). Each bushing 320 may be uniquely shaped such that further components (e.g., a cover mold insert or a cover) cannot be easily provided on, formed on and/or coupled to other components of the battery improperly or incorrectly. Providing unique (e.g., unique positive and negative cast-on-strap posts and/or bushings helps ensure that further components are not improperly or incorrectly assembled.

As shown in FIGS. 3-5B, in various embodiments, a cover 400 includes a first cover mold insert 410 and a second cover mold insert 470. In various exemplary embodiments, first cover mold insert 410 is not identical to second cover mold insert 470. In various exemplary embodiments, first cover mold insert 410 is shaped and/or sized differently (e.g., relatively differently) in some fashion from or than second cover mold insert 470. However, cover mold inserts 410/470 may be used interchangeably in connection with the same cover 400 or cover style or design depending upon the desired configuration (e.g., polarity) and/or terminals of the battery.

As shown in FIGS. 3-5B, in various embodiments, first cover mold insert 410 may include a first bushing 420 that is not identical to (e.g., shaped and/or sized differently than) a second bushing 430 of second cover mold insert 470. For example, in various embodiments, first bushing 420 has a diameter that is smaller than that of second bushing 430. In other embodiments, first bushing 420 has a diameter that is larger than that of second bushing 430. In such embodiments, the cast-on-strap posts of the battery may each include relative differences (e.g., be sized and/or shaped differently) to better correspond to each differently-sized and/or shaped bushing 420/430. For example, a first cast-on-strap and first bushing 420 may each have a smaller diameter (e.g., corresponding diameter) than a second cast-on-strap post and second bushing 430. Alternatively, a first cast-on-strap and first bushing 420 may each have a larger diameter than a second cast-on-strap post and second bushing 430.

As shown in FIGS. 5-5B, first cover mold insert 410 and second cover mold insert 470 may also have a first terminal 440 and a second terminal 450, respectively. In various embodiments, first terminal 440 is not identical to (e.g., shaped and/or sized differently than) second terminal 450. For example, first terminal 440 (e.g., the terminal corresponding to the positive charge) may be sized and/or shaped differently than second terminal 450 (e.g., the terminal corresponding to the negative charge). Sizing and/or shaping first terminal 440 and second terminal 450 relatively differently may help ensure that the battery is properly connected to a vehicle.

The different size and/or shapes of terminals 440/450 may also help ensure proper formation and/or help avoid improper formation. For example, in various embodiments, first terminal 440 has a diameter or width "$w_1$," while second terminal 450 has a diameter or width "$w_2$," where $w_1 > w_2$ or $w_2 > w_1$. For example, $w_1$ may equal $w_2 + \frac{1}{2} w_2$, $w_2 + \frac{1}{3} w_2$ or $w_2 + \frac{1}{4} w_2$, etc. In other embodiments, $w_2$ may equal $w_1 + \frac{1}{2} w_1$, $w_1 + \frac{1}{3} w_1$ or $w_1 + \frac{1}{4} w_1$, etc.

FIG. 6 shows a schematic representation of a secondary battery 500 including two different terminals 510/520 and two contacts 530/540 or connectors of formation cables according to an exemplary embodiment. In the embodiment shown in FIG. 6, a first formation cable 550 and a second formation cable 560 may be coupled to battery 500 during a formation stage of the manufacture of battery 500. As shown in FIG. 6, in various embodiments, formation cable 550 includes first contact 530 that has different size and/or shape relative to second contact 540. In various exemplary embodiments, the relationship between the sizes and/or shapes of the two contacts 530/540 is similar or generally correlates to the relationship between the cast-on-strap posts and/or terminals 510/520. It should be appreciated that other relationships between the two contacts are possible and that the relationship between the two contacts may be dissimilar to the relationship between the two cast-on-straps and/or terminals 510/520 of the battery 500.

Further, other apparatus or systems may utilize portions of the cast-on-strap, terminals and/or bushings to help ensure that they are coupled to the battery according to one or more desired orientations. For example, a formation cable (e.g., formation cable 550) may include two contacts (e.g., first contact 530 and second contact 540) having different relative sizes and/or shapes such that formation cable 550 may only be coupled to cover mold inserts or battery terminals according to one or more desired orientations. In various exemplary embodiments, the formation cable may be properly or easily coupled to the battery only according to one or more desired orientations. That is, in various embodiments, a relatively broader or wider second contact 540 cannot be easily or properly coupled to a relatively narrower or thinner first terminal 510 and a relatively thinner or narrower first contact 530 cannot be easily or properly coupled to a broader or wider second terminal 520. It should be appreciated that preventing improper coupling of components of the battery and/or other devices to the battery can help prevent improper assembly of the battery and/or improper use of the battery. For example, preventing or inhibiting the formation cable from being coupled to the battery in an undesired orientation helps ensure that the battery is properly connected and not improperly formed during the formation stage of the manufacture of the battery.

While the figures show certain terminals (e.g., U1, U1R, universal, etc.) one of ordinary skill in the art will appreciate that any variety of types of known or later-developed terminal and/or bushing sizes, shapes and/or arrangements may be utilized in various embodiments.

Referring again to FIG. 2, each cell element or chapter includes at least one positive plate, at least one negative plate, and a separator positioned between each positive and negative plate. Separators are provided between the plates to prevent shorting and undesirable electron flow produced during the reaction occurring in the battery.

Positive and negative electrode plates can be classified into various types according to the method of manufacturing the same. As one example, a paste type electrode is shown in FIGS. 7-9. In various embodiments, the paste type electrode includes a grid substrate and an electrochemically active material or "paste" provided on the substrate. The grid may be formed of a soft alloy containing a trace of calcium for enhancing the mechanical strength of the substrate.

Referring to FIGS. 7-9, the positive and negative plates each comprise a lead or lead alloy grid that supports an electrochemically active material. The grids provide an electrical contact between the positive and negative active materials or paste which serves to conduct current. The grids also serve as a substrate for helping support electrochemically active material (e.g., paste) deposited or otherwise provided thereon during manufacture to form battery plates.

As set forth in greater detail below, known arts of lead acid battery grid making include: (1) batch processes such as book mold gravity casting; and (2) continuous processes such as strip expansion, strip stamping, continuous casting, and continuous casting followed by rolling. Grids made from these processes tend to have unique features characteristic of the particular process and behave differently in lead acid batteries, especially with respect to the pasting process. It should be appreciated that grids formed from any conventional or later-developed grid manufacturing process may be utilized, and it is not the intent to limit the invention to the grid design disclosed herein.

In various embodiments, at least some of the grids are stamped grids. FIG. 7 illustrates an exemplary embodiment of a stamped grid 610 (e.g., a grid for a positive plate) with active material 620 or paste provided thereon. FIG. 8 illustrates the stamped grid 610 shown in FIG. 7, but without active material. In various embodiments, stamped grid 610 includes a frame that includes a top frame element, first and second side frame elements, and a bottom frame element. In various embodiments, the stamped grid includes a series of grid wires that define open areas that help hold the active material or paste that helps provides current generation. In various embodiments, a current collection lug is integral with the top frame element. While FIGS. 7-8 depict the lug as offset from the center of the top frame element, the lug may alternatively be centered or positioned closer to either the first or second side frame elements. The top frame element may include an enlarged conductive section at least a portion of which is directly beneath the lug to optimize current conduction to the lug.

The bottom frame element may be formed with one or more downwardly extending feet (not shown) for spacing the remainder of the grid away from the bottom of the battery container. In various embodiments, at least some of the wires increase in cross-sectional area along their length from bottom to top or have a tapered shape so as to optimize the current carrying capacity of the wires to help carry away increasing current being generated from the bottom to the top. The width and spacing of the wires between side elements may be predetermined so that there are substantially equal potential points across the width of the grid. To assist in supporting the electrochemical paste and/or permit the formation of paste pellets, in various embodiments, the stamped grid also includes horizontal wires which are equally spaced apart and are parallel to the top and/or bottom frame elements. As shown in FIG. 7-8, however, at least some of the horizontal wires may not be equally spread apart or parallel to the top and/or bottom frame elements.

Various stamped grid designs may be utilized. See, e.g., U.S. Pat. Nos. 5,582,936; 5,989,749; 6,203,948; 6,274,274; 6,921,611; 6,953,641; 7,398,581; 7,763,084; 7,767,347 and U.S. patent application Ser. Nos. 11/086,525; 10/819,485; and Ser. No. 12/529,599, each of which are incorporated herein by reference in their entireties. It should be noted that an infinite number of grid designs may be utilized and therefore, it is not the intent of the following description to limit the invention to the grid design shown in FIGS. 7-9, which are presented for the purposes of illustration.

An exemplary embodiment of an expanded metal grid 710 (e.g., a grid for the negative plate) is illustrated in FIG. 9. In various embodiments, expanded metal grid 710 has a pattern (e.g., a diamond pattern such as that shown in FIG. 9), which is well known in the art, with a bottom frame element, and a top frame element that is integral with a lug.

Referring to FIGS. 7-9, the cross-section of the grid wires may vary depending upon the grid making process. To help improve adhesion of the battery paste, however, in various embodiments, the grid wires may be mechanically reshaped or refinished. It should be appreciated that any number of grid wire shapes may be utilized as long as the shape provides suitable paste adhesion characteristics. For example, the cross section of wires may be of any cross-section design including substantially oval shaped, substantially rectangular, substantially diamond shape, substantially rhomboid shape, substantially hexagon shape, and/or substantially octagon shape. In the battery grid, each grid wire section may have a different cross-sectional configuration, or each grid wire section may have the same or a similar cross-sectional configuration. However, it is preferred that each grid wire section have the same cross-sectional configuration. Depending on the needs, a grid can be deformed at the vertical wire elements only, the horizontal wire elements only, or at both the vertical and horizontal wire elements.

The active material or paste is typically a lead-based material (e.g., PbO, $PbO_2$, Pb or $PbSO_4$ at different charge/discharge stages of the battery) that is pasted, deposited or otherwise provided onto the grids. The paste composition may be determined by power requirements, cost and battery environment, as it is known in the art. In various embodiments, the active material of a lead-acid battery is prepared by mixing lead oxide, sulfuric acid and water. The lead oxide reacts with the sulfuric acid to form mono-, tri- and/or tetrabasic lead sulfate(s). Dry additives, such as fiber and expander, may also be added to the active material. For example, in various embodiments, expanders such as finely-divided carbons (e.g., lampblack or carbon black), barium sulfate and various lignins may be included in the active material. In various embodiments, the mixture is then dried and water is re-added to form a paste of the desired consistency.

The active material provided on the positive grid (e.g., lead dioxide [$PbO_2$]), is typically in micro-particle form, so that the electrolyte is allowed to diffuse and permeate through the lead dioxide microparticles on the positive electrode plate. The spongy lead, the active material of the negative electrode plate, is typically porous and reactive, so that the electrolyte is allowed to diffuse and permeate through the sponge lead on the negative electrode plate.

To prevent the separation of the active materials from the grids and to ensure easy handling of the active materials in the manufacture of electrodes, a pasting paper (not shown) may be adhered or otherwise provided on at least one of the surfaces of the active material as a support to the active material after deposition on the grids. Porous nonwoven fabric (e.g., having micron-sized pores), instead of paper, may alternatively be provided into the surface or on the active material to prevent the separation and handling problems of the active material and initial high rate discharge degradation. For example, a nonwoven fabric synthesized from thermoplastic resin by spun-bonding or thermal-bonding may be used. In various embodiments, nonwoven fabric formed of one or more polyesters, polypropylenes, or viscose rayon is used.

As shown in FIG. 9, in various embodiments, one or more battery separators 730 are used to conductively separate the positive and negative electrodes. The separator material is typically microporous to allow the through passage of ions from the positive and negative electrodes. Separators for automotive batteries are typically made in continuous lengths and rolled, subsequently folded as shown in FIG. 9, and sealed along one or more of their edges to form pouches that receive a battery plate (e.g., a negative plate as shown in FIG. 9 or a positive plate as shown in FIG. 2).

In various embodiments, separator material generally has a substantially uniform thickness and a substantially uniform pore distribution. The pore distribution helps ensure an overall uniform current density during operation, thereby helping achieving a uniform charging and discharging of the electrodes and maximum battery efficiency. A separator generally incorporates one or more ribs (e.g., as shown in FIG. 9) to help stiffen the separator.

The separate material may be constructed of a variety of materials (e.g., polyolefin, rubber, phenol-formaldehyde resorcinol, glass mat, microporous PVC, and sintered PVC). In various embodiments, the separator is comprised of a microporous sheet comprised of high molecular weight polyolefin. Examples of polyolefins that may be used include polyethylene, polypropylene, polybutene, ethylene-propylene copolymers, ethylene-butene copolymers, propylene-butene copolymers and ethylene-propylene-butene copolymers.

In various embodiments, the separator is also constructed of an inert filler material. The filler can be soluble or insoluble in water. However, the filler may provide the primary means by which any plasticizer is absorbed and held in the composition and should not be soluble in the plasticizer. The preferred filler is dry, finely divided silica. However, other fillers (e.g., carbon black, coal dust, graphite, metal oxides and hydroxides, metal carbonates, minerals, zeolites, precipitated metal silicates, alumina silica gels, wood flour, wood fibers and bark products, glass particles, salts such as barium sulfate, inorganic salts, acetates, sulfates, phosphates, nitrates, carbonates and/or combinations thereof) may be utilized. It should also be understood that any known or later-developed wetting agents (e.g., sodium alkyl benzene sulfonate, sodium lauryl sulfate, dioctyl sodium sulfosuccinate, and isoctyl phenyl polyethoxy ethanol) may be utilized to enhance the wettability of the filler.

In various embodiments, a separator also includes at least one plasticizer. The plasticizer may be soluble or insoluble in water. Examples of plasticizers that may be used include organic esters, epoxy compounds, phosphate esters, hydrocarbon materials, and low molecular weight polymers.

In various embodiments, the separator is comprised of a stabilizer or an antioxidant. In various embodiments, conventional stabilizers or antioxidants such as 4,4 thiobis (6-tert-butyl-m-cresol) ("Santonox"), and, 2,6-di-tert-butyl-4-methylphenol ("Ionol") may be utilized.

When the separator is provided with one or more ribs, the ribs may be formed from a number of known or later-developed polymeric compositions (e.g., the same composition as the separator, other polyolefins, polyvinyl chloride, and/or filled or foamed compositions thereof). The ribs may be provided in any number of ways. For example, the ribs may be formed by extrusion (either unitarily with the sheet or separately). The ribs may also be formed by grooving or embossing. When ribs are molded separately, they may be bonded or otherwise coupled to the sheet or base web by any number of methods known in the art including heat sealing or by an adhesive.

While a particular rib configuration is shown in FIG. 9, one skilled in the art will appreciate that any variety of rib configuration may be utilized depending at least in part on the grid design, plate design and/or battery.

The thickness of a separator will vary depending upon the type of battery in which it is used. In general, the thickness of the base web can range from 1 to 50 mils. For lead-acid batteries, the preferred thickness range is typically 10 to 40 mils. The height of each rib may vary over a wide range depending upon plate spacing requirements. Generally, ribs from 5 to 200 mils in height from the base are provided, with the preferred range being 10 to 100 mils.

In various embodiments, one or more components of the secondary battery is sized and/or shaped to prevent improper formation, assembly and/or use of the secondary battery. In various embodiments, one or more cast-on-strap, a portion of one or more cast-on-straps (e.g., a post of a cast-on-strap), one or more bushings, one or more cover mold inserts and/or one or more terminals is uniquely designed. The unique design of such components helps encourage proper formation, assembly and/or use of the secondary battery and/or helps discourage misformation, improper assembly and/or use of the secondary battery.

Various chemistries in which the electrochemical potential between various materials is used to generate electricity have been studied and commercially implemented. See, in general: Besenhard, J. O., Ed., *Handbook of Battery Materials*, Wiley-VCH Verlag GmbH, Weinheim, Germany, 1999; and Linden, D., Ed., *Handbook of Batteries*, Second Edition, McGraw Hill Inc., New York, N.Y., 199, both of which are incorporated herein by reference.

A plate for a lead-acid battery is conventionally made by applying active material or paste to a conductive support such as a lead alloy grid. Plates can be classified according to the method of manufacturing the same. For example, one process for producing battery plates includes an initial step of melting hot lead in a furnace, followed by a step of feeding molten lead alloy to a strip caster. In the strip expansion process, a cast or wrought lead strip is typically pierced, stretched above and below the strip plane, and then pulled or expanded to form a grid with a diamond pattern. In various embodiments, the strip is coiled on a winder, and coils of lead alloy strip are stored for later use. In various embodiments, the strip may also be rolled. To form a battery grid, in various embodiments, the strip is fed through an expander that cuts, slits, and stretches a strip of coil to form the grids.

The grids may be produced using other known or later-developed processes. For example, as discussed above, the substrate may be formed by a casting process (e.g., by pouring a melted alloy into a mold), a stamping process, or by continuous rolling. During the manufacture of the grids or the plates, the grid wires may be refinished or reshaped (e.g., to improve adhesion of the paste).

The active material or paste is then applied to or otherwise provided (e.g., pasted by a conventional paster) on the expanded strip or wire grid. In various embodiments, one or more pasting materials or pasting papers are provided on one or both surfaces of the active material. In various embodiments, the pasting materials or paper may be provided in a continuous process.

In various embodiments, the grids, active material and pasting material or paper are fed to a divider where the strip is cut into plates. Plates cut from the strip may be flattened or otherwise modified to help smooth out any uneven regions of paste. In various embodiments, the plates pass (e.g., on a conveyor) through an oven for flash-drying, and may then be stacked for later use. Conventionally, flash-drying may be performed using an open gas flame or an oven, e.g., as a 10-15 second drying of the plates in a conventional blast drying oven at about 260 deg C. (about 500 deg F.). After drying, the battery plates undergo a chemical treatment, well known to those skilled in the art. The pasted plates are next typically cured for many hours under elevated temperature and humidity to help oxidize any free lead and otherwise adjust the crystal structure of the plate.

Conventional polyolefin battery separators are typically produced by a process that comprises blending a composition of high molecular weight polyolefin, an inert filler material, and/or a plasticizer, forming the composition into sheet form, and subsequently extracting a portion of the inert filler and/or plasticizer from the sheet using a solvent.

After curing, the plates are assembled into batteries. Groupings of individual battery plates may be assembled, enveloped, interleaved or otherwise separated with separator material, and provided together to form plate sets. For example, in one common battery design, every other plate (e.g., each negative plate) in the battery set is inserted into a battery separator in the form of an envelope. The envelope acts as a separator between the plate in the envelope and the adjoining plates in the battery set. The plate sets are assembled in a container to help form a battery.

During assembly, the positive lugs of the battery plates are coupled together and the negative lugs of the battery plates are coupled together. This is typically accomplished using cast-on straps formed by taking assembled battery stacks, inverting them, and dipping the lugs into molten lead provided in a mold. Such cast-on-straps may be uniquely formed depending on their use as a positive cast-on-strap or negative cast-on-strap. To permit current to follow throughout the battery, cast-on straps of stacks are joined or coupled. Moreover, terminal electrodes or posts are provided which extend through the cover or casing to permit electrical contact with a vehicle's electrical system or other system requiring or intended to use battery power. As discussed above, the bushing and/or the terminal may be uniquely sized, shaped or formed depending on its use with a positive cast-on-strap or a negative cast-on-strap.

In various embodiments, the battery housing, including the cover, is provided containing the battery cells. In various embodiments, the battery housing is submerged in acidic electrolyte fluid in order to fill the battery housing with electrolyte fluid through the fill tube holes in the battery cover. After filling the battery housing with electrolyte fluid, the battery is removed from the electrolyte fluid. Any residual electrolyte fluid coating, dust, and other debris may be washed away to prepare the battery for shipment. Before washing the battery housing external surfaces, the fill tube holes may be plugged to prevent washing fluid from entering the battery housing.

Following the initial wash, the batteries are electrochemically formed by passage of current to convert the lead sulfate or basic lead sulfate(s) to lead dioxide (positive plates) or lead (negative plates). This is referred to as the "formation" process. As outlined above, the formation process may utilize a formation cable. Such a formation cable may include one or more contacts that couple to each terminal of the battery. In various embodiments, each terminal of the battery is uniquely formed and each contact of the formation cable is formed to correspond to a terminal such that the formation cable can only be coupled to the battery according to one or more desired orientations.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the FIGURES. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the battery or electrodes as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various exemplary embodiments without departing from the spirit or scope of the present inventions.

What is claimed is:

1. A secondary battery comprising:
   a battery housing having a battery cover thereon, the battery cover comprising a first cover mold insert and a second cover mold insert;
   the first cover mold insert having a first bushing portion defining a first bushing having a first aperture of a first lateral cross-section;
   the second cover mold insert having a second bushing portion defining a second bushing having a second aperture of a second lateral cross-section;
   wherein the first aperture of the first bushing couples around a first terminal post passing into and/or through the cover from an interior of the battery housing and the second aperture of the second bushing couples around a second terminal post passing into and/or through the cover from an interior of the battery housing; wherein the first lateral cross-section is different from the second lateral cross-section;
   wherein the first cover mold insert has a first terminal portion offset from the bushing portion and extending away from the battery housing and the second cover mold insert has a second terminal portion offset from the second bushing portion and extending away from the battery housing, and wherein the first terminal portion is sized or shaped differently from the second terminal portion.

2. The secondary battery of claim 1, wherein the first lateral cross-section defines a first cross-sectional shape, the second lateral cross-section defines a second cross-sectional shape, and the first cross-sectional shape and second cross-sectional shape are different.

3. The secondary battery of claim 1, wherein the first lateral cross-section defines a first cross-sectional area, the second lateral cross section defines a second cross-sectional area, and the first cross-sectional area and second cross-sectional area are different.

4. The secondary battery of claim 1, wherein the first cover mold insert and second cover mold insert are interchangeable in the battery cover.

5. The secondary battery of claim 1, wherein the first terminal portion has a first width and the second terminal portion has a second width, and wherein the first width and second width are different.

6. The secondary battery of claim 5, further comprising a battery assembly wherein the first terminal portion is releasably coupleable to a first cable connector having a first connector width and the second terminal portion is releasably coupleable to a second cable connector having a second connector width, and wherein the first connector width and the second connector width are different.

7. The secondary battery of claim 1, wherein the first terminal portion defines a third circular aperture and the second terminal portion defines a fourth circular aperture.

8. The secondary battery of claim 1, wherein the first bushing portion has a first side opposite a second side and a third side perpendicularly coupled to the first and second side, the third side being opposite a fourth side.

9. The secondary battery of claim 8, wherein the first terminal portion perpendicularly couples to the fourth side.

10. The secondary battery of claim 9, wherein the first terminal portion couples along an entire length of the fourth side.

11. The secondary battery of claim 1, wherein the first terminal portion has a rounded top.

12. The secondary battery of claim 1, wherein the first terminal portion has a first terminal portion width and the first base portion has a first base portion width, and wherein the first base portion width and first terminal portion width are approximately equal.

13. A secondary battery comprising:
   a battery housing having a battery cover thereon, the battery cover comprising a first cover mold insert and a second cover mold insert;
   the first cover mold insert having a first bushing portion defining a first bushing having a first aperture of a first lateral cross-section;
   the second cover mold insert having a second bushing portion defining a second bushing having a second aperture of a second lateral cross-section;
   wherein the first aperture of the first bushing couples around a first terminal post passing into and/or through the cover from an interior of the battery housing and the second aperture of the second bushing couples around a second terminal post passing into and/or through the cover from an interior of the battery housing; wherein the first lateral cross-section is different from the second lateral cross-section;
   wherein the first cover mold insert has a first terminal portion offset from the bushing portion and extending away from the battery housing and the second cover mold insert has a second terminal portion offset from the second bushing portion and extending away from the battery housing, and wherein the first terminal portion is sized or shaped differently from the second terminal portion, and wherein the first terminal portion has a first width and the second terminal portion has a second width, the first width being different from the second width.

* * * * *